(12) United States Patent
Duffield et al.

(10) Patent No.: US 7,898,976 B2
(45) Date of Patent: *Mar. 1, 2011

(54) METHODS AND APPARATUS FOR DETECTION OF HIERARCHICAL HEAVY HITTERS

(75) Inventors: Nicholas Duffield, Summit, NJ (US); Carsten Lund, Berkeley Heights, NJ (US); Subhabrata Sen, New Providence, NJ (US); Yin Zhang, Austin, TX (US); Sumeet Singh, San Diego, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 165 days.

This patent is subject to a terminal disclaimer.

(21) Appl. No.: 12/236,369

(22) Filed: Sep. 23, 2008

(65) Prior Publication Data

US 2009/0016234 A1 Jan. 15, 2009

Related U.S. Application Data

(63) Continuation of application No. 11/042,771, filed on Jan. 24, 2005, now Pat. No. 7,437,385.

(60) Provisional application No. 60/538,496, filed on Jan. 23, 2004.

(51) Int. Cl.
*G06F 11/30* (2006.01)
*G06F 12/00* (2006.01)

(52) U.S. Cl. ...................................... 370/252

(58) Field of Classification Search ................. 370/352, 370/395.3, 338, 310, 227, 252, 408; 714/57; 707/790, 793; 209/231
See application file for complete search history.

(56) References Cited

U.S. PATENT DOCUMENTS

| | | | |
|---|---|---|---|
| 6,396,842 B1 | 5/2002 | Rochberger | |
| 6,980,537 B1 | 12/2005 | Liu | |
| 7,099,881 B2 | 8/2006 | Richardson et al. | |
| 7,424,489 B1 * | 9/2008 | Duffield et al. | ..................... 1/1 |
| 7,437,385 B1 * | 10/2008 | Duffield et al. | ..................... 1/1 |
| 2004/0057424 A1 | 3/2004 | Kokkonen | |
| 2004/0111420 A1 | 6/2004 | Hofstee et al. | |
| 2005/0039086 A1 | 2/2005 | Krishnamurthy et al. | |
| 2005/0185578 A1 | 8/2005 | Padmanabhan et al. | |
| 2009/0016234 A1 | 1/2009 | Duffield et al. | |
| 2009/0073891 A1 * | 3/2009 | Duffield et al. | .............. 370/252 |

OTHER PUBLICATIONS

Graham Cormode et al. Diamond in the Rough: Finding Hierarchical Heavy Hitters in Multi-dimensional Data.*
Graham Cormode "finding Hierarchical Heavy Hitters in Data Streams".*
Yin Zhang et al. "ONline Identification of Hierachical Heavy Hitters: Algorithms, Evaluation, and application".*
Manku, Gumeet Singh et al., "Approximate Frequency Counts over Data Streams" Proceeding of the 28 th VLDB Conference, Hong Kong, China 2002.

* cited by examiner

*Primary Examiner*—Hung T Vy

(57) ABSTRACT

An efficient streaming method and apparatus for detecting hierarchical heavy hitters from massive data streams is disclosed. In one embodiment, the method enables near real time detection of anomaly behavior in networks.

20 Claims, 4 Drawing Sheets

METHODS AND APPARATUS FOR DETECTION OF HIERARCHICAL HEAVY HITTERS

This application is a continuation of U.S. patent application Ser. No. 11/042,771, filed Jan. 24, 2005, now U.S. Pat. No. 7,437,385 which claims the benefit of U.S. Provisional Application No. 60/538,496 filed on Jan. 23, 2004. All of the above-cited applications are herein incorporated by reference in their entirety.

The present invention relates generally to traffic monitoring and, more particularly, to a method and apparatus for identifying hierarchical heavy hitters for monitoring one or more networks, e.g., packet communication networks such as VoIP networks.

BACKGROUND OF THE INVENTION

The Internet has emerged as a critical communication infrastructure, carrying traffic for a wide range of important scientific, business and consumer applications. Network service providers and enterprise network operators need the ability to detect anomalous events in the network, for network management and monitoring, reliability, security and performance reasons. While some traffic anomalies are relatively benign and tolerable, others can be symptomatic of potentially serious problems such as performance bottlenecks due to flash crowds, network element failures, malicious activities such as denial of service attacks (DoS), and worm propagation. It is therefore very important to be able to detect traffic anomalies accurately and in near real-time, to enable timely initiation of appropriate mitigation steps.

One of the main challenges of detecting anomalies is the mere volume of traffic and measured statistics. Given today's traffic volume and link speeds, the input data stream can easily contain millions or more of concurrent flows, so it is often impossible or too expensive to maintain per-flow state. The diversity of network types further compounds the problem. Thus, it is infeasible to keep track of all the traffic components and inspect each packet individually for anomaly behavior.

Another major challenge for anomaly detection is that traffic anomalies often have very complicated structures: they are often hierarchical (i.e. they may occur at arbitrary aggregation levels like ranges of IP addresses and port numbers and so on).

Therefore, a need exists for a method and apparatus for near real-time detection of hierarchical heavy hitters for monitoring packet networks, e.g., Voice over Internet Protocol (VoIP) networks.

SUMMARY OF THE INVENTION

In one embodiment, the present invention discloses a method and apparatus for detecting hierarchical heavy hitters from massive data streams with a large number of flows. In one embodiment, the data structure is adaptive to the offered traffic and carries a synopsis of the traffic in the form of a set of estimated hierarchical aggregates of traffic activity. The structure is adapted in that each aggregate contains no more than a given proportion of the total activity unless the aggregates are not further divisible.

This method has much lower worst-case update cost than existing methods, and provides deterministic accuracy that is independent of the offered data. In one embodiment, the invention provides a method for adjusting the threshold proportion for detection. Therefore, the level of reported detail can be traded off against the computational time.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for detecting hierarchical heavy hitters. Although the present invention is discussed below in the context of detecting traffic anomalies in a network, the present invention is not so limited. Namely, the present invention can be applied in the context of datamining, trending, forecasting, outlier detection and the like. Furthermore, although the present invention is discussed below in the context of packets, the present invention is not so limited. Namely, the present invention can be applied in the context of records, fields, or any other unit or measure of data. For the purpose of scope, the term packet is intended to broadly include a record or a field.

Figure 1:
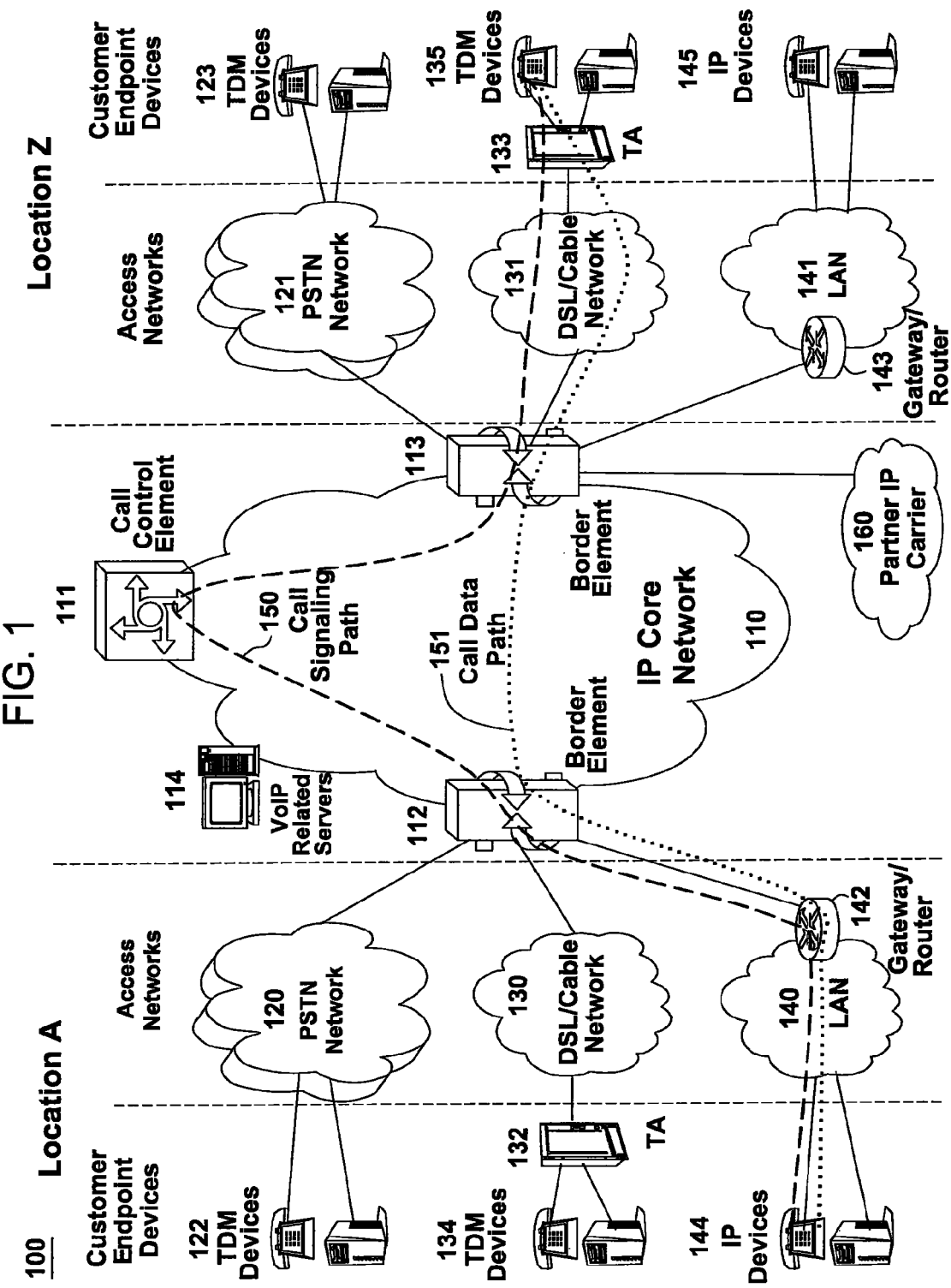
FIG. 1 illustrates an exemplary network related to the present invention.

To better understand the present invention, FIG. 1 illustrates an example network, e.g., a packet network such as a VoIP network related to the present invention. The VoIP network may comprise various types of customer endpoint devices connected via various types of access networks to a carrier (a service provider) VoIP core infrastructure over an Internet Protocol (IP) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above VoIP network is described to provide an illustrative environment in which a large quantity of packets may traverse throughout the entire network. It would be advantageous to be able to detect anomalous events in the network to monitor performance bottleneck, reliability, security, malicious attacks and the like. In order to so, it would be advantageous to first detect "heavy hitters". In one embodiment, the present hierarchical heavy hitter detection method as discussed below can be implemented in an application server of the VoIP network.

In order to clearly illustrate the present invention, the following packet network related concepts will first be described. These concepts are that of:

A Heavy Hitter (HH);
A Hierarchical Heavy Hitter (HHH);
A child node;
A fringe node; and
An internal node.

A Heavy Hitter (HH) is an entity that accounts for at least a specified proportion of the total activity measured in terms of number of packets, bytes, connections etc. A heavy hitter could correspond to an individual flow or connection. It could also be an aggregation of multiple flows/connections that share some common property, but which themselves may not be heavy hitters.

Of particular interest to packet network application is the notion of hierarchical aggregation. For example, IP addresses can be organized into a hierarchy according to prefix. The challenge for hierarchical aggregation is to efficiently compute the total activity of all traffic matching relevant prefixes.

A hierarchical heavy hitter is a hierarchical aggregate that accounts for some specified proportion of the total activity.

Aggregations can be defined on one or more dimensions, e.g., source IP address, destination IP address, source port, destination port, protocol fields for IP flows and the like.

Multidimensional Heavy Hitters are multidimensional sets of hierarchical aggregates that account for some specified proportion of the total activity.

In one embodiment, the invention is illustrated with a data network structure used to identify address prefixes in IP network. Each node is associated with a prefix. A child of a node shares the prefix of the parent node but has an additional bit specified. (i.e., if the parent's prefix is p*, the child's prefix is either p0* or p1*). Generally, the bit "0" is associated with the child created first and the path from the parent node points towards the left. Bit "1" is associated with the child created second and the path from the parent node points to the right.

Fringe nodes are nodes with no descendant. Internal nodes have 1 or 2 descendant nodes (one child associated with bit 0 and one child associated with bit 1).

The Internet has emerged as a critical communication infrastructure, carrying traffic for a wide range of important scientific, business and consumer applications. Network service providers and enterprise network operators need the ability to detect anomalous events in the network, for network management and monitoring, reliability, security and performance reasons. While some traffic anomalies are relatively benign and tolerable, others can be symptomatic of potentially serious problems such as performance bottlenecks due to flash crowds, network element failures, malicious activities such as denial of service attacks (DoS), and worm propagation. It is therefore very important to be able to detect traffic anomalies accurately and in near real-time, to enable timely initiation of appropriate mitigation steps.

The major challenges for detection of anomalies are the volume of traffic and the complicated structures of the traffic. This invention provides a method for identifying Hierarchical Heavy Hitters. The candidate traffic is then further analyzed for abnormal behavior.

In order to assist the reader, the invention will first provide the definition of hierarchical heavy hitters and introduce the heavy hitter detection problem.

The present invention adopts the Cash Register Model to describe the streaming data. Let, $I=\alpha_1, \alpha_2, \alpha_3, \ldots$, be an input stream of items that arrives sequentially. Each item $\alpha_i=(k_i,u_i)$ consists of a key $k_i$, and a positive update $u_i \epsilon \Re$. Associated with each key k is a time varying signal A[k]. The arrival of each new data item $(k_i,u_i)$ causes the underlying signal $A[k_i]$ to be updated: $A[k_i] +=u_i$.

DEFINITION 1 (HEAVY HITTER)—Given an input stream $I=\{(k_i,u_i)\}$ with total sum $SUM=\Sigma_i u_i$ and a threshold $\phi(0 \leq \phi \leq 1)$, a Heavy Hitter (HH) is a key k whose associated total value in I is no smaller than $\phi SUM$. More precisely, let $v_k=\Sigma_{i:k_i=k} u_i$ denote the total value associated with each key k in I. The set of Heavy Hitters is defined as $\{k|v_k \geq \phi\ SUM\}$.

The heavy hitter problem is the problem of finding all heavy hitters, and their associated values, in a data stream. For instance, if the destination IP address is the key, and the byte count is the value, then the corresponding HH problem is finding all the destination IP addresses that account for at least a proportion $\phi$ of the total traffic.

DEFINITION 2 (HIERARCHIAL HEAVY HITTER)— Let $I=\{(k_i,u_i)\}$ be an input stream whose keys $k_i$ are drawn from a hierarchical domain D of height h. For any prefix p of the domain hierarchy, let elem(D, p) be the set of elements in D that are descendents of p. Let $V(D, p)=\Sigma_k v_k: k\epsilon\ elem(D, p)$ denote the total value associated with any given prefix p. The set of Hierarchical Heavy Hitters (HHH) is defined as $\{p|V(D, p) \geq \phi SUM\}$.

The hierarchical heavy hitter problem is defined as the problem of finding all hierarchical heavy hitters, and their associated values, in a data stream. If the destination IP address is used to define the hierarchical domain, then the corresponding HHH problem is defined as the problem of not only finding the destination IP addresses but also identifying all the destination prefixes that account for at least a proportion $\phi$ of the total traffic.

In one embodiment, the present invention provides a method for finding all the HH prefixes, including the descendents of p. The method can be adapted and used for more strict definition of HHH. In one embodiment, the invention uses a simpler definition to perform change detection on HHHs and avoids missing big changes buried inside the prefixes that would not be tracked under the more strict definition.

Once the hierarchical heavy hitters have been detected in each time interval, their values are tracked across time to detect significant changes, which may indicate potential anomalies. This is referred to as the change detection problem.

The present invention discloses streaming methods for detecting hierarchical heavy hitters and significant changes in massive data streams that are typical of today's IP traffic. This is accomplished by identifying all possible keys that have a volume associated with them that is greater than the heavy-hitter detection threshold at the end of the time interval. In the context of network traffic a key can be made up of fields in the packet header and it may be associated with very large ranges. For example in the case of IP prefixes the range is: $\lfloor 0,2^{32})$. Also the key may be a combination of one or more fields, which can result in significant increase in the complexity of the problem. Clearly monitoring all possible keys in the entire range can be prohibitive.

The invention provides a method that builds an adaptive data structure. The data structure dynamically adjusts the granularity of the monitoring process to ensure that the particular keys that are heavy-hitters (or more likely to be heavy-hitters) are correctly identified without wasting a lot of resources (in terms of time and space) for keys that are not heavy-hitters. The data structure resembles a decision tree that dynamically drills down and starts monitoring a node (that is associated with a key) closely only when its direct ancestor becomes sufficiently large.

In one embodiment, the invention uses two key parameters: $\phi$ and $\epsilon$. Given the total sum SUM, $\phi$ SUM is the threshold for a cluster to qualify as a heavy hitter; $\epsilon$ SUM specifies the maximum amount of inaccuracy that can be tolerated in the estimates generated by the method.

To guide the building process of the summary data structure, a threshold is used. The threshold will be referred to as the split threshold, $T_{split}$. $T_{split}$ is used to make local decisions at each step and determine when the range of keys under consideration should be looked at in a finer grain. It is chosen to ensure that the maximum amount of traffic that can be missed during the dynamic drill-down is at most $\epsilon$ SUM for any cluster. The actual choice of $T_{split}$ depends on the method. The invention assumes that SUM is a pre-specified constant.

To exemplify the teachings of the invention, let the destination IP address be the dimension for HHH detection and let the metric to be used for detecting heavy-hitters be the volume of traffic (e.g. number of bytes) associated with a given key. Note that the metric as well as the field to be considered for the dimension may be changed based on the application requirements.

In traditional anomaly detection methods, given a hierarchical network, a scheme is used to transform the HHH detection problem to essentially multiple non-hierarchical HH detection problems, one for each distinct combination of prefix length value across all the dimensions of the original key space.

For a 1-dimensional key space with a hierarchy of height $h_i$, there are $(h_i+1)$ non-hierarchical HH detection problems, which have to be solved in tandem. Such a brute force approach needs to update the data structure for all possible combinations of prefix lengths and requires extensive resources. Two variants of the brute force approach that differ from each other only in the method used to detect the HHs are provided for illustrative and comparative purposes. The results of the two brute force methods are referred to as Baseline Variant 1 and Baseline Variant 2 as described below:

Baseline variant 1: Sketch-based solution, (sk), which uses sketch-based probabilistic HH detection. Count-Min sketch is a probabilistic summary data structure based on random projections for a good overview of sketch and specific sketch operations. Let [m] denote set $\{0, 1 \ldots, m-1\}$. A sketch S consists of an H×K table of registers: $T_S[i, j]$ $(i\epsilon[H], j\epsilon[K])$. Each row $T_S[i,\bullet]$ $(i\epsilon[H])$ is associated with a hash function $h_i$ that maps the original key space to [K]. The data structure can be view as an array of hash tables. Given a key, the sketch allows one to reconstruct the value associated with it, with probabilistic bounds on the reconstruction accuracy. The achievable accuracy is a function of both the number of hash functions (H), and the size of hash tables (K). This method uses a separate sketch data structure per distinct prefix length combination in the defined dimension.

Baseline variant 2: Lossy Counting-based solution (lc), which uses a deterministic single-pass, sampling-based HH detection method called Lossy Counting. Lossy Counting uses two parameters: $\epsilon$ and $\phi$, where $0 \leq \epsilon << \phi \leq 1$. At any instant, let N be the total number of items in the input data stream. Lossy Counting can correctly identify all heavy-hitter keys whose frequencies exceed $\phi$ N. lc provides lower and upper bounds on the count associated with a heavy hitter. The gap between the two bounds is guaranteed to be at most $\epsilon$ N. The space overhead for the method is $$O\left(\frac{1}{\epsilon}\log(\epsilon N)\right).$$

The Lossy Counting method can be modified to work with byte data instead of count data. All the complexity and accuracy results still apply except that N is replaced by SUM. This adapted version is used by the current invention for evaluation. In the worst-case scenario, the performance of the lc is an indicative for the worst-case performance of any other methods based on Lossy Counting.

Unlike the brute force methods, the current invention utilized an Adaptive Decision Tree (ADT) to identify the prefixes (considering using the destination IP as the key) that are responsible for an amount of traffic that exceeds a given threshold. The invention provides a method to identify the prefixes associated with the heavy hitters while maintaining minimal state data and performing a minimum number of update operations for each arriving flow of traffic or packet.

The hierarchical nature of the problem is similar to the classical IP lookup problem in which for every received packet the IP destination field in the packet header is used to search for a longest matching prefix in a set of given IP prefixes (also known as a routing table). The difference between the current problem and the IP lookup problem is that in the IP lookup problem case the set of prefixes is given as an input and is often static. In contrast, the current method needs to generate the set of prefixes that are associated with the heavy hitters dynamically, based on the packet arrival pattern.

Despite the difference, however, the present invention utilizes an ADT for the dynamic case and provides a method for the 1-d HHH detection by adapting the trie-based solution, which is traditionally used for the static IP lookup problem.

Figure 2:
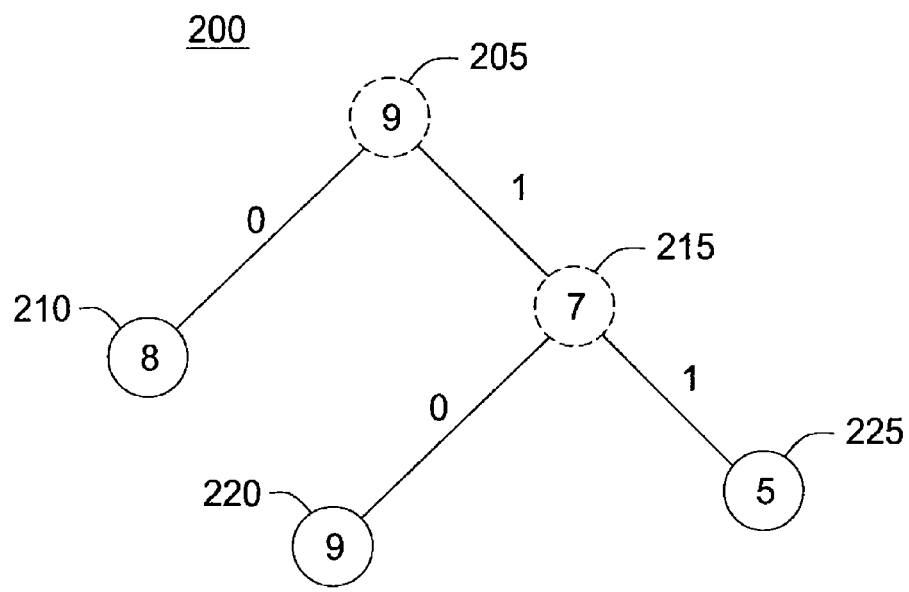
FIG. 2 illustrates an example of a trie at the arrival of a packet.

FIG. 2 illustrates the one-bit trie data structure at the time of a packet arrival. A standard trie data structure starts with a single node trie that is associated with the zero-length prefix. Each node in a one-bit trie has at most two child nodes, one associated with bit 0 and the other with bit 1. The path directed towards the child associated with bit 0 is generally directed to the left of the parent node. The path directed to the right of the parent node is associated with bit 1.

The trie data structure and the present invention are extendable to m-bits. For an m-bit tries, each node of the trie has $2^m$ children, similar to the idea of the multi-bit tries used for IP lookup problems. However for simplicity the present invention is described using one-bit tries.

FIG. 2 illustrates an example of a trie 200 at the arrival of a packet. To illustrate, dotted circles 205 and 215 represent internal nodes. Solid circles 210, 220 and 225 represent the fringe nodes. The links to the child nodes associated with bit 0 are 210 and 220. The links to the child nodes associated with bit 1 are 215 and 225. For example, the addressing for node 225 would start with 11 and the addressing for node 220 would start with 10. The volumes for all the nodes are shown inside of the circles.

The present invention maintains a standard trie data structure that starts with a node that is associated with a zero-length prefix. The volume field associated with that node is incremented with the size of each arriving packet. When the value in this field exceeds $T_{split}$, the node is marked as internal and a new child node associated with the prefix 0* or 1* that the incoming packet matches is created. The size of the current packet is then used to initialize the volume field in the newly created child node. The structure develops dynamically with the arrival of each new packet. The implementation also includes some special handling when the bottom of the trie is reached (i.e. when all bits in the key are used). In one illustrative example, the update operation is illustrated for a trie with $T_{split}$ set to 10.

Figure 3:
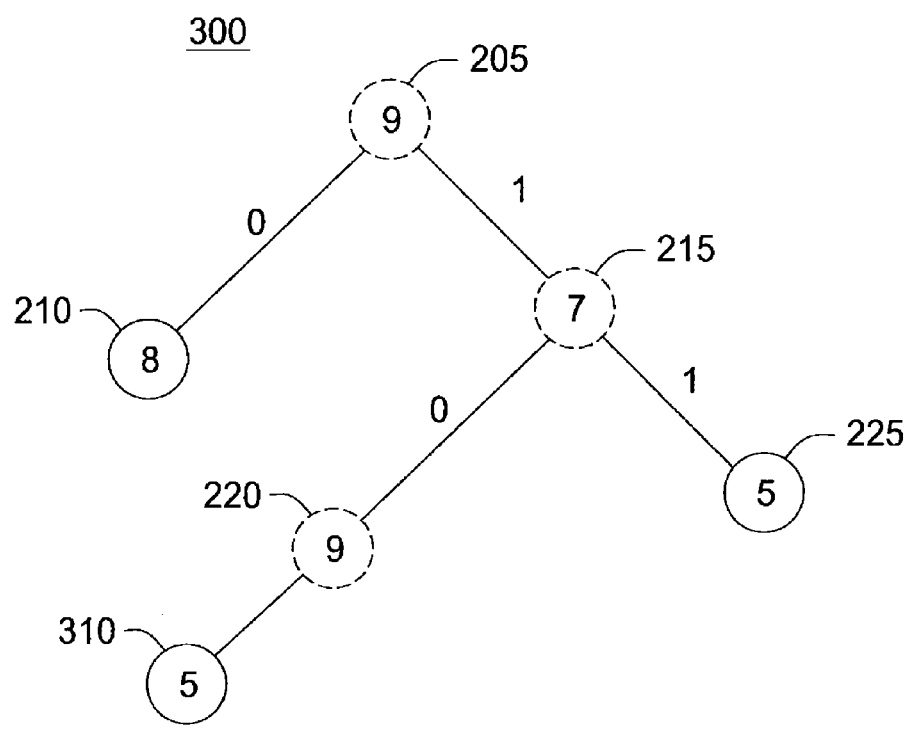
FIG. 3 illustrates the trie of FIG. 2 after update for the packet.

FIG. 3 shows the trie 300 after an update operation is completed. To illustrate, the arriving packet has a Destination IP prefix of 100* and a size of 5 bytes. The method first performs a longest matching prefix operation on the trie and arrives at the node associated with prefix 10*. Adding 5 bytes to the volume field of this node would make its value exceed $T_{split}$. Therefore, the method creates a new node associated with prefix 100* (i.e., the child node associated with bit 0). The size of the current packet is used to initialize the volume field of the newly created node. After the update, the fringe node 220 in FIG. 2 becomes an internal node 112. The new child (fringe) node 310 is indicated in FIG. 3.

As illustrated, the invention's trie construction process guarantees that the value of the volume field in any internal node to always be less than $T_{split}$. As a result, $T_{split}$ is set such that $T_{split}=\epsilon$ SUM/W and the maximum amount of traffic missed as the method dynamically drills down to the fringe is set to be at most $\epsilon$ SUM.

The time complexity of the operations described above is on the same order of magnitude as a regular IP lookup operation. For every packet arrival, at most one node in the trie is updated. At most one new node is created during each update as long as the volume for the new item is below $T_{split}$ (in case the volume exceeds $T_{split}$, an entire new branch all the way to the maximum depth W is created). At each depth, there can be no more than SUM/$T_{split}$=W/$\epsilon$ internal nodes (otherwise the total sum over all the subtries rooted at those nodes would exceed SUM, which is impossible). So the worst-case memory requirement of the data structure is O (W$^2$/$\epsilon$).

As illustrated in FIGS. 2 and 3, every packet arrival results in at most one update. The update occurs at the node which is the most specific node representing the destination IP prefix (of the packet) at the time of the packet arrival. Therefore the volumes of the internal nodes need to be reconstructed at the end of the time interval. By delaying the reconstruction process to the end of the time interval, the reconstruction cost is amortized across the entire time interval. To compute the volumes associated with all the internal nodes, a recursive post-order traversal of the trie is performed. In each recursive step the volume of the current node is computed as being the sum of the volume represented in the current trie node and its child nodes.

Note that because of utilizing $T_{split}$ to guide the trie construction process, the volumes represented in the internal nodes even after reconstruction are not entirely accurate. In order to more accurately estimate the volume associated with a given node, an estimate of the missed traffic for that node needs to be included. Below three ways of estimating the missed traffic are considered:

Copy-all: the missed traffic for a node N is estimated as the sum of the total traffic seen by the ancestors of node N in the path from node N to the root of the tree. Note that copy-all is conservative in that it copies the traffic trapped at a node to all its descendents. It always gives an upper bound for the missed traffic. Since the update operation maintains the invariant that every internal node N has volume below $T_{split}$, the estimate given by the copy-all rule is further upper bounded by the product of the depth of the node and $T_{split}$.

No-copy: this is the other extreme that optimistically assumes the amount of missed traffic to be 0.

Splitting: the total contribution of missed traffic by a node N is split among all its children C in proportion to the total traffic for C. Essentially what this assumes is that the traffic pattern before and after the creation of a node are very similar, so missed traffic is predicted by proportionally splitting the traffic trapped at a node to all its children.

Both the copy-all and the splitting rule can be easily implemented by traversing the trie in a top-down fashion.

Once the estimate for the missed traffic is available, it is combined with the total amount of observed traffic and the resulting sum is used as an input for the HHH detection. The accuracy will depend on the method selected.

Figure 4:
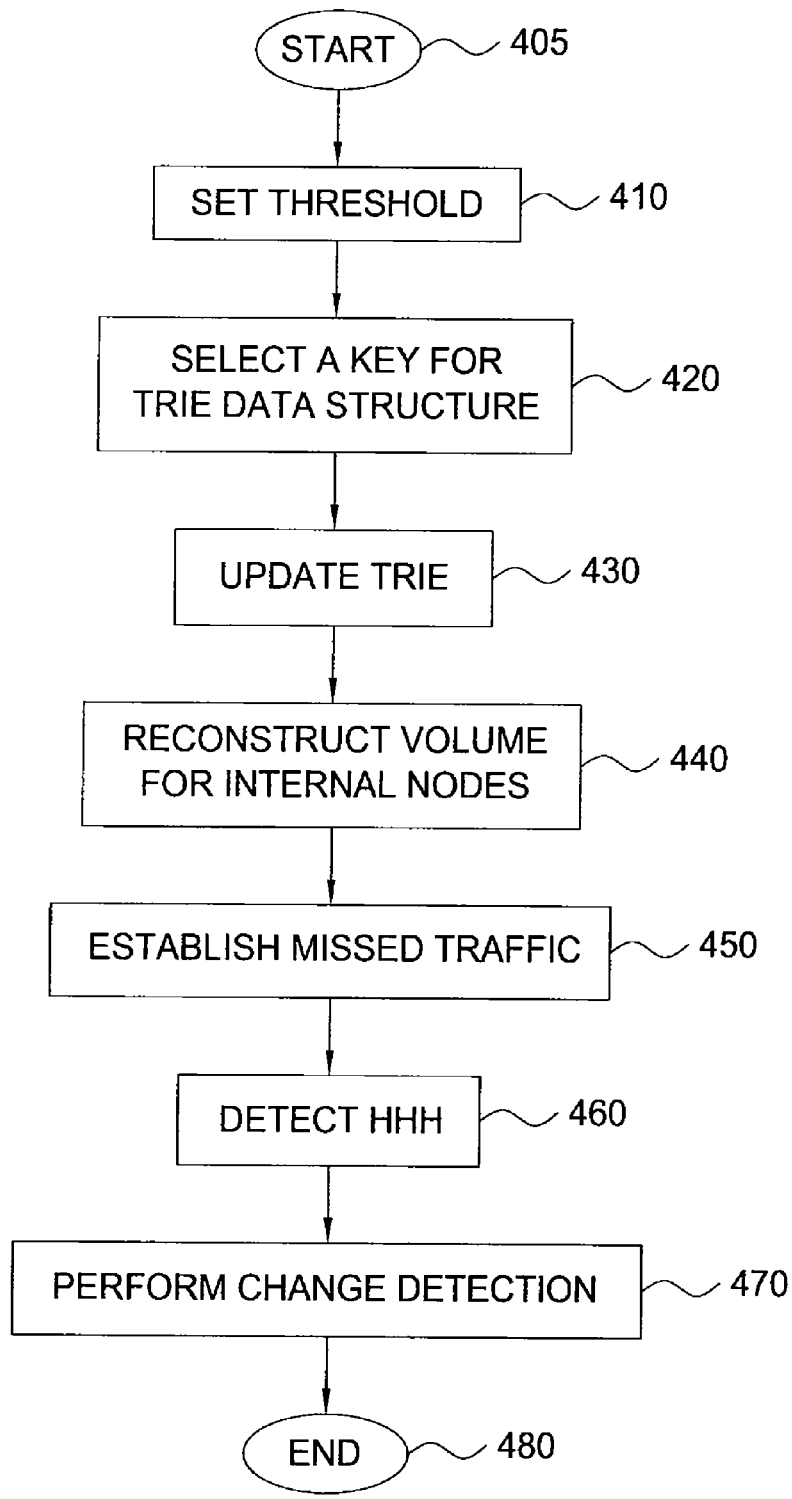
FIG. 4 illustrates a flowchart of a method for detecting a hierarchical heavy hitter.

FIG. 4 illustrates a flowchart of a method 400 for detecting a hierarchical heavy hitter. Method 400 starts in step 405 and proceeds to step 410.

In step 410, method 400 sets a threshold, e.g., $T_{split}$. This threshold is used to determine when a node will split.

In step 420, method 400 select a key, e.g., associated with IP address, for a trie data structure, e.g., 200 of FIG. 2.

In step 430, the trie data structure is updated. For example, for each packet received, the trie data structure is updated with respect to returning the longest matching prefix and incrementing the volume of the relevant node. It should be noted that step 430 is repeated for a predefined period of time in accordance with the specific requirement of a particular implementation. In other words, within a certain defined period or time interval, e.g., one minute, five minutes, one hour, and so on, packets are received and the trie data structure is updated for each received packet.

In step 440, method 400 reconstructs or aggregate volume for each of the internal nodes. For example, at the end of a time interval, the present invention performs a recursive post-order traversal of the trie structure.

In step 450, method 400 estimates the missed traffic corresponding to each node, since all packets are not captured and analyzed. Various methods for estimating missed traffic can be used, e.g., the copy-all method, the no-copy method and the splitting method as discussed.

In step 460, method 400 detects the HHHs. For example, since method 400 now has the observed traffic and the estimated traffic for a node, it can now combine the observed and estimated missed traffic, where the combined traffic can be compared with historical or predicted measure of total traffic for that node. Method 400 is then able to determine the HHH(s).

Once the HHHs are detected, method 400 in step 470 can implement any number of change detection methods to detect changes or anomalous events in the network. The important aspect is then once the network is able to determine HHHs, the network is better equipped to more accurately and efficiently detect anomalous events. Method 400 may proceed to perform other post analysis or functions, e.g., reporting function, and the like. Method 400 ends in step 480.

Figure 5:
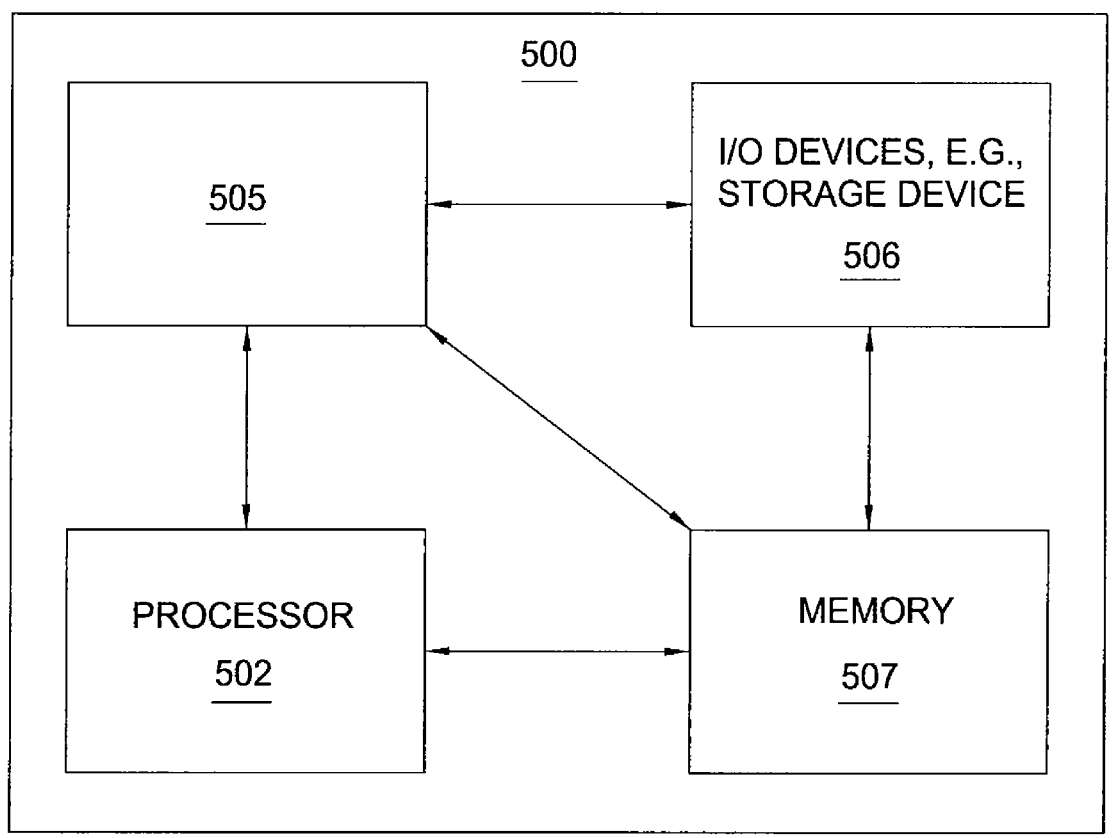
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a hierarchical heavy hitter detection module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present hierarchical heavy hitter detection module or process 505 can be loaded into memory 504 and executed by processor 502 to implement the functions as discussed above. As such, the present hierarchical heavy hitter detection method 505 (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a hierarchical heavy hitter from a stream of packets, comprising:
   receiving a packet from the stream of packets;
   associating a key with a field of the packet;
   applying an adaptive trie data structure, where each node of the adaptive trie data structure is associated with the key; and
   using via a processor the adaptive trie data structure to determine the hierarchical heavy hitter, wherein the using the adaptive trie data structure to determine the hierarchical heavy hitter comprises:
      reconstructing a volume for each node that is an internal node;
      estimating missed traffic for each of the internal node; and
      determining the hierarchical heavy hitter in accordance with a combination of the volume that is reconstructed and the missed traffic that is estimated.

2. The method of claim 1, wherein the stream of packets is received from a packet network.

3. The method of claim 2, wherein the packet network is an internet protocol network.

4. The method of claim 1, wherein the applying the adaptive trie data structure comprises:
   updating the adaptive trie data structure for each received packet.

5. The method of claim 4, wherein the updating comprises:
   updating a volume of a node in the adaptive trie data structure.

6. The method of claim 4, wherein the updating comprises:
determining whether an additional node is to be added into the adaptive trie data structure in accordance with a threshold.

7. The method of claim 1, further comprising:
applying the hierarchical heavy hitter to perform a change detection.

8. A non-transitory computer-readable medium having stored thereon a plurality of instructions, the plurality of instructions including instructions which, when executed by a processor, cause the processor to perform a method for detecting a hierarchical heavy hitter from a stream of packets, comprising:
receiving a packet from the stream of packets;
associating a key with a field of the packet;
applying an adaptive trie data structure, where each node of the adaptive trie data structure is associated with the key; and
using the adaptive trie data structure to determine the hierarchical heavy hitter, wherein the using the adaptive trie data structure to determine the hierarchical heavy hitter comprises:
reconstructing a volume for each node that is an internal node;
estimating missed traffic for each of the internal node; and
determining the hierarchical heavy hitter in accordance with a combination of the volume that is reconstructed and the missed traffic that is estimated.

9. The non-transitory computer-readable medium of claim 8, wherein the stream of packets is received from a packet network.

10. The non-transitory computer-readable medium of claim 9, wherein the packet network is an internet protocol network.

11. The non-transitory computer-readable medium of claim 8, wherein the applying the adaptive trie data structure comprises:
updating the adaptive trie data structure for each received packet.

12. The non-transitory computer-readable medium of claim 11, wherein the updating comprises:
updating a volume of a node in the adaptive trie data structure.

13. The non-transitory computer-readable medium of claim 11, wherein the updating comprises:
determining whether an additional node is to be added into the adaptive trie data structure in accordance with a threshold.

14. The non-transitory computer-readable medium of claim 8, further comprising:
applying the hierarchical heavy hitter to perform a change detection.

15. An apparatus comprising a processor for detecting a hierarchical heavy hitter from a stream of packets, comprising:
the processor configured to:
receive a packet from the stream of packets;
associate a key with a field of the packet;
apply an adaptive trie data structure, where each node of the adaptive trie data structure is associated with the key; and
use the adaptive trie data structure to determine the hierarchical heavy hitter, wherein the processor is configured to:
reconstruct a volume for each node that is an internal node;
estimate missed traffic for each of the internal node; and
determine the hierarchical heavy hitter in accordance with a combination of the volume that is reconstructed and the missed traffic that is estimated.

16. The apparatus of claim 15, wherein the stream of packets is received from a packet network.

17. The apparatus of claim 16, wherein the packet network is an internet protocol network.

18. The apparatus of claim 15, wherein:
the processor is configured to update the adaptive trie data structure for each received packet.

19. The apparatus of claim 15, wherein the processor is configured to use a copy-all method.

20. The apparatus of claim 15, wherein the processor is configured to use a splitting method.

* * * * *